United States Patent [19]

Salzman et al.

[11] 4,123,178

[45] Oct. 31, 1978

[54] IN-LINE BLENDER

[75] Inventors: Ronald N. Salzman; Norman R. Herbst, both of Rochester, N.Y.

[73] Assignee: General Signal Corporation, Rochester, N.Y.

[21] Appl. No.: 779,872

[22] Filed: Mar. 21, 1977

[51] Int. Cl.$^2$ .............................................. B01F 5/00
[52] U.S. Cl. .............................................. 366/338
[58] Field of Search ................ 259/4 R, 4 A, 4 AB, 259/4 AC; 138/37, 38, 42, 43; 48/180 R, 180 M, 180 B; 261/79 R, 79 A; 366/336–339

[56] References Cited

U.S. PATENT DOCUMENTS

| 953,136 | 3/1910 | Goodwin et al. | 239/399 |
|---|---|---|---|
| 1,094,667 | 4/1914 | Masten | 138/42 X |
| 1,259,266 | 3/1918 | Moseley | 48/180 R |
| 1,436,190 | 11/1922 | Musgrave | 138/38 |
| 2,635,641 | 4/1953 | Kasten | 138/43 X |
| 3,048,559 | 8/1962 | Heller et al. | 59/4 R X |
| 3,286,992 | 11/1966 | Armeniades et al. | 259/4 |
| 3,664,638 | 5/1972 | Grout et al. | 259/4 |
| 3,704,006 | 11/1972 | Grout et al. | 259/4 |
| 3,794,300 | 2/1974 | Harder | 259/4 |
| 3,800,985 | 4/1974 | Grout et al. | 259/4 X |
| 3,827,676 | 8/1974 | Brasie | 259/4 |
| 3,844,541 | 10/1974 | Artho et al. | 259/4 R |
| 3,861,652 | 1/1975 | Clark et al. | 259/4 |
| 3,922,220 | 11/1975 | Middleman et al. | 210/23 |

FOREIGN PATENT DOCUMENTS

| 735,033 | 8/1932 | France. | |
| 1,592 of | 1858 | United Kingdom | 138/38 |
| 8,320 of | 1894 | United Kingdom | 138/38 |

OTHER PUBLICATIONS

Drawing No. 1793 of Komax Systems, Inc.

*Primary Examiner*—Philip R. Coe
*Attorney, Agent, or Firm*—Jeffrey S. Mednick; Harold Huberfeld

[57] ABSTRACT

An in-line blender is provided for mixing a single fluid or blending it with at least one other substance. The blender includes a conduit having a hollow interior disposed about a central axis and a shaft extending longitudinally through the conduit along the central axis. The blender also includes a plurality of stationary mixing stages extending in series along the central axis with each of the mixing stages defining a plurality of spiral channels within the hollow interior of the conduit. Each of the mixing stages includes a plurality of distinct segments extending in series along the central axis. The blender further includes means for adjusting both the angular and the axial position of each of the segments with respect to adjacent segments along the shaft. The in-line blender is assembled by securing a retaining device to one end of the shaft, placing a plurality of mixing elements on the shaft in sliding engagement therewith, and positioning each mixing element at a desired angular and axial position on the shaft. A holding device is secured on a second end of the shaft so as to hold the mixing element in compression between the holding device and the retaining device. The shaft and mixing elements are then placed within a conduit and secured therein so as to prevent relative axial movement therebetween.

26 Claims, 9 Drawing Figures

IN-LINE BLENDER

BACKGROUND OF THE INVENTION

The present invention relates generally to blenders for mixing a fluid passing through a conduit and more particularly to a blender including a plurality of serially arranged mechanically fixed flow detectors for dividing and recombing the fluid passing therethrough.

In many areas of technology it is frequently desirable to mix a fluid with one or more other substances while the substances are passing through a conduit en route to a delivery point. It has been necessary to mix gasses, liquids, and even some solids, of a powdered or particulate nature. In the past numerous devices have been employed to solve this problem, and these devices have been generally classified as in-line blenders and mixers, static or motionless blenders and mixers, or interfacial surface generators. Although such devices have taken on numerous forms, it is known in the art that a particularly effective means of mixing such substances includes a plurality of spiral flow paths which are periodically subdivided and reversed in direction of twist.

For example, U.S. Pat. No. 3,286,992 to Armeniades et al discloses a mixing device having a hollow cylindrical tube and a plurality of curved sheet-like elements extending in series longitudinally within the tube throughout the length thereof. The sheet-like elements have periodic reversals of curvature and are affixed to the walls of the tube.

U.S. Pat. No. 3,794,300 to Harder discloses an in-line blender having a shaft extending longitudinally through a conduit and having a plurality of sheet-like mixer elements spirally twisted about the shaft and affixed to it. Although such devices have generally performed in an acceptable manner, they have exhibited certain shortcomings. Since each mixing stage in these devices has been made of continuous sheet material, the amount of rotation imparted to the fluid per mixing stage has been fixed for each stage. Furthermore, the mixing stages in the prior devices have not been easily adjusted to change flow patterns and accomodate different flow conditions. Thus, different mixing devices have been required to satisfy different flow conditions. Additionally, although these devices have generally been effective for mixing under laminar flow conditions, they have not been as effective under turbulent flow conditions. Finally, such devices have usually been of a rather permanent nature and have not been easily disassembled for cleaning.

SUMMARY OF THE INVENTION

Accordingly, an in-line blender is provided for mixing a single fluid or blending it with at least one other substance. The blender includes a conduit having a hollow interior disposed about a central axis and a shaft extending longitudinally through the conduit along the central axis. The blender also includes a plurality of stationary mixing stages extending in series along the central axis with each of the mixing stages defining a plurality of spiral channels within the hollow interior of the conduit. Each of the mixing stages includes a plurality of distinct segments extending in series along the central axis. The blender further includes means for adjusting both the angular and the axial position of each of the segments with respect to adjacent segments along the shaft. The in-line blender is assembled by securing a retaining device to one end of the shaft, placing a plurality of mixing elements on the shaft in sliding engagement therewith, and positioning each mixing element at a desired angular and axial position on the shaft. A holding device is secured on a second end of the shaft so as to hold the mixing element in compression between the holding device and the retaining device. The shaft and the mixing elements are then placed within a conduit and secured thereto so as to prevent relative axial movement therebetween.

OBJECTS OF THE INVENTION

An object of the present invention is the provision of an in-line blender which may be easily adapted for use in both laminar and turbulent flow conditions.

Another object of the present invention is the provision of an in-line blender whose components may be easily assembled and disassembled for cleaning and repositioning.

A further object of the present invention is the provision of an in-line blender of such a design that the number of flow channels may be varied.

Still another object of the present invention is the provision of an in-line blender which is both simple in construction and inexpensive to manufacture.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
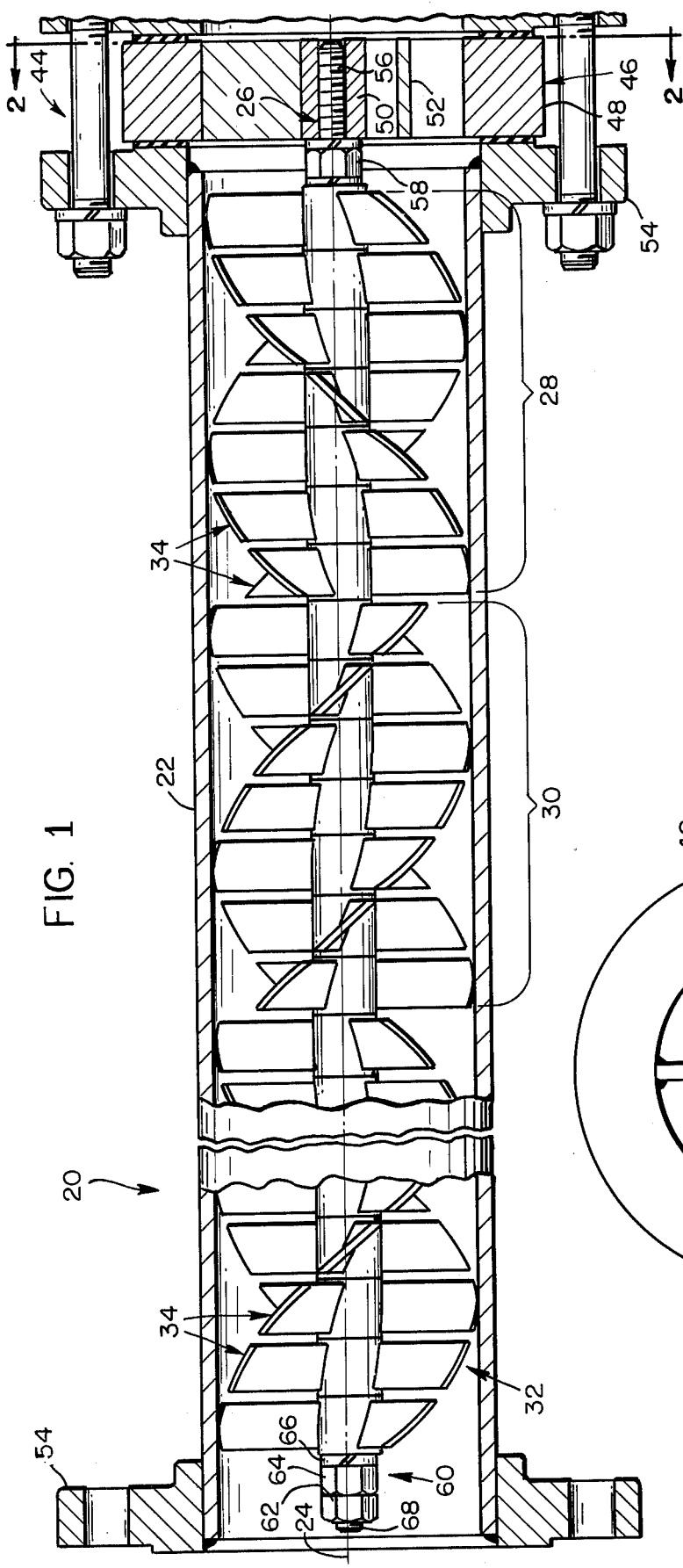
FIG. 1 is a side view, partly in cross-section, of an in-line blender of the present invention.
Figure 2:
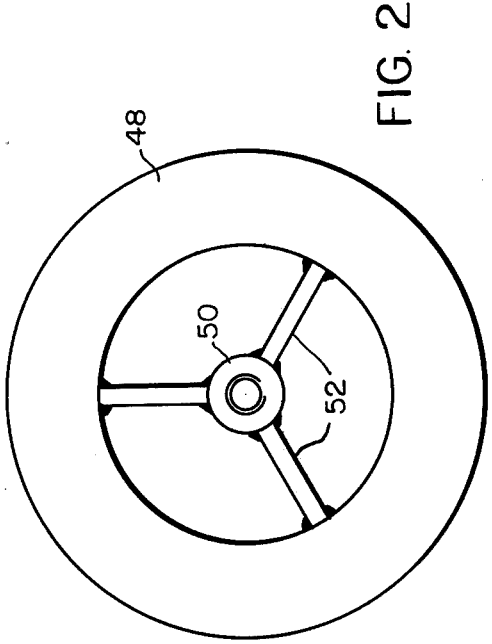
FIG. 2 is an end view of a portion of the in-line blender shown in FIG. 1.
Figure 4:
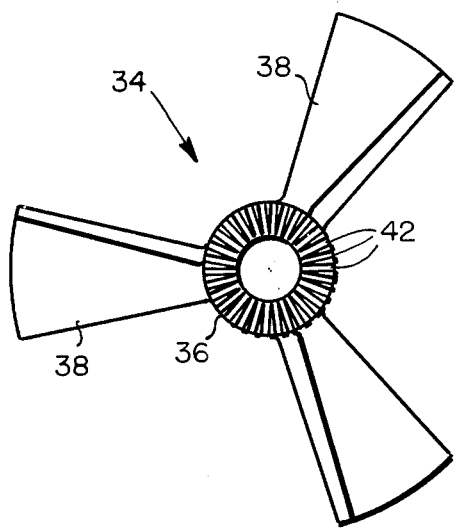
FIG. 4 shows the mixing element shown in FIG. 3 as viewed from the opposite end.
Figure 3:
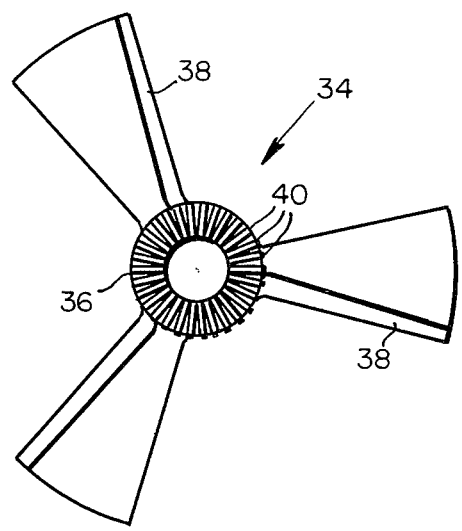
FIG. 3 shows an end view of a single mixing element of the present invention.
Figure 5:
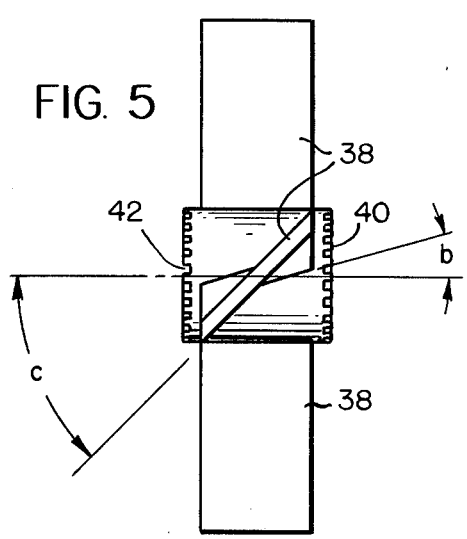
FIG. 5 shows a partial enlarged side view of the mixing element shown in FIG. 3.

Referring to FIGS. 1 through 5 of the drawings, a preferred embodiment of the in-line blender of the present invention will be described in detail. FIG. 1 shows an in-line blender 20 including a conduit 22 having a hollow interior disposed about a central axis 24. The substances to be mixed are introduced into a section of conduit 22 upstream of the conduit 22, in a known manner. A shaft 26 extends longitudinally through the conduit 22 along the central axis 24. Mounted on the shaft 26 are a plurality of mixing stages 28, 30, 32, etc., extending in series along the shaft within the conduit 22. In a preferred embodiment there are six such mixing stages. However, it should be understood that in any particular case the number of mixing stages may be determined by the properties of the substances being mixed, the desired flow, the desired pressure drop through the mixer, and the cost of manufacture. Each of the mixing stages define a plurality of spiral channels within the hollow interior of the conduit 22. These spiral channels extend the entire length of each of the mixing stages. One of the particularly unique features of the present invention is that each of the mixing stages includes of plurality of distinct segments or mixing elements 34. Each of the segments or mixing elements 34 is formed in the shape of a propeller and, as is best seen in FIGS. 3 and 4, includes a hub 36 and a plurality of blades 38 extending radially outwardly from the hub 36. Each of the blades includes a spiral twist. The angle of each blade 38 at the base thereof with respect to the central axis 24 is designated in FIG. 5 as angle $b$. The angle that the radially outward tip of the blade 38 forms with the central axis 24 is designated in FIG. 5 as angle $c$. The difference between these two angles (angle $b$-$c$) is the angle of twist of each blade. In FIG. 5, angle $b$ is illustrated as being 15° and angle $c$ as 45° so that the angle of twist $b$-$c$ is equal to 30°. The tip angle $c$ determines the pitch of each mixing stage (i.e., the axial length required to rotate a channel through 360°) and in cooperation with the hub diameter determines the hub angle $b$. Depending on the substances being mixed and the desired pressure drop over the entire length of the blender 20, the tip angle $c$ will generally vary from 30° to 60°. For a given tip angle $c$ and a given axial length per segment, the number of segments 34 within each mixing stage will determine the amount of rotation imparted to the fluid passing through that mixing stage. Thus in the embodiment illustrated in FIG. 1, there are seven segments creating 180° of rotation for each spiral channel within each mixing stage. The axial length of the segments 34 determines the degree of flexibility one would have in altering the flow patterns within the blender 20 and thus the axial length of the segments 34 may be chosen accordingly. Although for economy of design, the axial length of each segment 34 has been illustrated as being equal, it is to be understood that it is within the scope of the present invention to include segments having different axial lengths within the same blender. In the embodiment shown in FIG. 1, the axial distance between blades of adjacent sections is preferably minimized to eliminate crossover flow between channels. In this embodiment the axial distance between blades will preferably be significantly less than the thickness of a blade. The radial dimension of the blades 38 is such that each blade 38 will touch or nearly touch the inner walls of the conduit 22. A slight amount of clearance is desired between the outer tips of the blades 38 and the walls of the conduit 22 to permit the entire mixing structure to be withdrawn from the conduit 22, as will be discussed in more detail later.

Another particularly unique feature of the present invention is that each of the segments 34 further includes means for adjusting both the angular and the axial position of each of the segments with respect to adjacent segments along the shaft 26. The adjusting means includes the hub 36 and indexing means on the axial ends of the hubs for maintaining a predetermined fixed angular relationship between adjacent hubs. As can be seen most clearly in FIGS. 3, 4, and 5, this indexing means comprises a plurality of linear projections 40, projecting axially from the ends of the hub 36, extending radially outwardly from the hole in the hub surrounding shaft 26, and spaced an equal angular distance from one another about one end of the hub 36. These projections are preferably 30 in number and are spaced 12° apart, although a greater or lesser number of projections could be provided depending on the accuracy of indexing required. Correspondingly, a plurality of linear depressions or grooves 42 are formed in the opposite axial end of the hub 36, extend radially outwardly from the hole in the hub surrounding shaft 26, and are spaced equally about the end of the hub 36. These depressions 42 are spaced in a like manner to the projections 40, and thus would be spaced 12° apart. Since in assembling the blender 20 the hubs 36 are in sliding engagement with the shaft 26, it is apparent that when adjacent hubs are placed in an abutting relationship, the projections 40 will engage the depressions 42 to thereby prevent relative rotation between adjacent segments. It will be understood by those skilled in the art that other means of preventing rotation between adjacent segments could be provided. For example, each of the hubs 36 could include a set screw extending radially therein to engage the shaft 26 and prevent axial or angular movement between the hub 35 and the shaft 26.

Thus, a plurality of segments may be axially and angularly positioned on the shaft 26 to define a plurality of spiral channels which rotate in a first direction, for example, as shown in mixing stage 28. Likewise, a second stationary mixing stage 30 may be placed axially adjacent the first mixing stage 28 to define a plurality of spiral channels which rotate in a second angular direction opposite to the first angular direction. Preferably, the leading edges of the blades of the first segment of mixing stage 30 are positioned so as to bisect the spiral channels defined by mixing stage 28. This generally results in optimal division of flow and therefor optimal mixing of the substances passing through conduit 22. Likewise, subsequent mixing stages will generally result in a reversal of twist of the sprial channels and also will bisect the spiral channels of the previous mixing stage. However, it should be understood that it is within the scope of this invention to position the various mixing stages and segments in any manner that proves desirable. Thus, several mixing stages could be placed axially adjacent one another without a reversal of flow and the angle of intersection between axially adjacent mixing stages may be varied. As was mentioned above, the number of mixing stages within the blender 20 may also vary in accordance with various desired flow and mixing characteristics.

Although the mixing segments 34 are illustrated as having three blades and thus creating three spiral channels within the conduit 22, it is within the scope of the present invention to vary the number of blades 38 in accordance with the mixing characteristics one wishes to design into the blender 20. For most mixing applications from two to four blades should prove sufficient to provide the desired flow and mixing through conduit 22. In the embodiment shown in FIG. 1, three blades are preferred.

The blender 20 further includes a retaining means 44 shown in cross-section in FIG. 1 and in an end view in FIG. 2. The retaining means includes a retaining member 46 having an outer ring 48, an inner hub 50, and a plurality of vanes 52 extending radially outwardly from the hub 50 to the ring 48. The vanes 52 are preferably identical in number to the number of blades on the first mixing segment, and are preferably aligned with the leading edges of these blades. Although the in-line blender of the present invention is suitable for mixing fluids flowing therethrough in either direction, the retaining means 44 is preferably located on the inlet end of the blender so that flow in FIG. 1 would be from right to left.

The conduit 22 includes flanges 54 mounted on both ends thereof to enable the in-line blender 20 to be bolted to adjacent sections of conduit. The ring 48 is adapted to be clamped between the flange 54 and the flange of an adjacent section of conduit. The inner surface of the hub 50 is threaded as is an end portion 56 of shaft 26. A threaded adapter 58 threadingly engages end portion 56 of shaft 26 and hub 50 of retaining member 46 to prevent axial movement therebetween. The opposite end of shaft 26 is externally threaded and adapted to receive a holding means 60 for holding the mixing stages in compression against the retaining means 44 and thereby prevent axial movement of the mixing steps within the conduit 22. The holding means preferably includes a pair of nuts 62 and 64 and a lock washer 66 which threadingly engage the threaded end portion 68 of shaft 26 to hold the mixing stages in compression against retaining means 44.

In a typical in-line blender of the type shown in FIG. 1, the blender components may be formed from a variety of materials, the most important selection criteria being that of sufficient strength and rigidity and the particular material selected does not react with the substances being mixed. One preferred such material is stainless steel. Additionally, the mixing segments 34 are preferably formed by casting to further the economy of manufacture. The diameter of the conduit 22 will generally vary from approximately 2 inches to approximately 12 inches. The length of the conduit 22 will generally be approximately equal to 10 times the diameter of the conduit.

The in-line blender 20 of the present invention is designed to be used for all types of flow conditions, i.e., laminar or turbulent. In laminar flow, the fluid particles move along straight, parallel paths in layers. The magnitudes of the velocity of adjacent layers are not the same. The viscosity of the fluid is dominant and thus suppresses any tendency of the flow to achieve turbulent conditions. In turbulent flow, the particles of fluid move in a haphazard fashion in all directions, making it impossible to trace the motion of an individual particle.

The Reynolds number for an in-line blender and a specific fluid can be calculated to determine whether the flow is in the laminar or turbulent range. The Reynolds number is defined as:

$$R_E = Vd\rho/\mu$$

where:
$R_E$ = Reynolds number
$V$ = mean veolicty of feet/second
$d$ = diameter of conduit in feet
$\rho$ = mass density of fluid in slugs/foot$^3$
$\mu$ = absolute viscosity in pounds seconds/foot$^2$ When the Reynolds number is less than 2,000, the flow is generally classified as laminar. When the Reynolds number of in-line blender 20 is greater than 2,000, the flow is generally classified as turbulent.

The embodiment of the in-line blender shown in FIG. 1 is generally preferred for laminar flow conditions. In the embodiment shown in FIG. 1, the angular and axial position of adjacent hubs is adjusted so as to minimize the space between the blades of adjacent segments to correspondingly optimize blending for laminar flow of fluid through the conduit 22. Thus distinct spiral channels are set up by each mixing stage, and no crossover flow is permitted between these channels. Accordingly, mixing is accomplished by rotation of the fluid within the channel and by periodically dividing flow at each new mixing stage.

Figure 6:
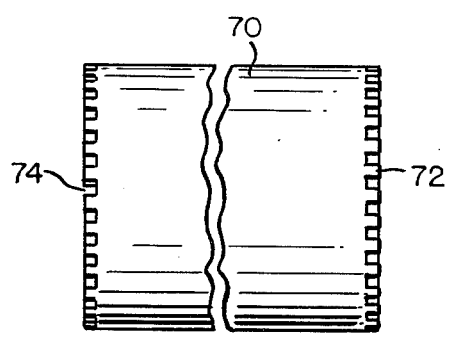
FIG. 6 shows a side view of a spacer element of the present invention.

On the other hand, the angular and axial position of the hubs with respect to adjacent hubs may be adjusted to define significant gaps between the blades of adjacent segments and thereby optimize blending for turbulent flow of fluid through the conduit 22. Both angular and axial displacement may be accomplished, for example, by utilizing set screws on each of the hubs and changing their relative positions on the shaft, as was discussed above. However, a preferred form of axial displacement is illustrated in FIG. 6 and includes the use of a plurality of spacer elements 70. These spacer elements may be of any desired axial length and may be interspersed as desired between adjacent hubs within a mixing stage to create gaps between adjacent segments blades. Each of the spacer elements 70 is placed in sliding engagement with the shaft 26 and includes indexing means on the axial ends thereof for maintaining a fixed angular relationship between adjacent hubs. The indexing means consists of projections 72 and 74 which are identical to the projections 40 and grooves 42 found on the hubs 36.

Figure 7:
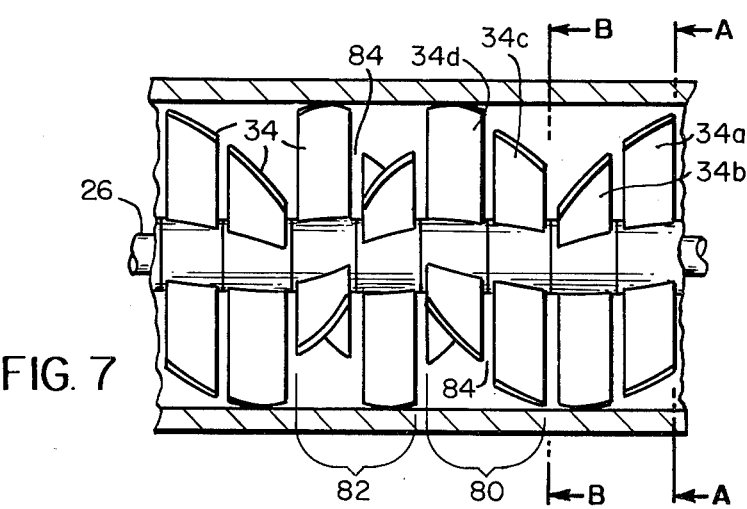
FIG. 7 shows a side view in partial cross-section of a second embodiment of the present invention.
Figure 7A:
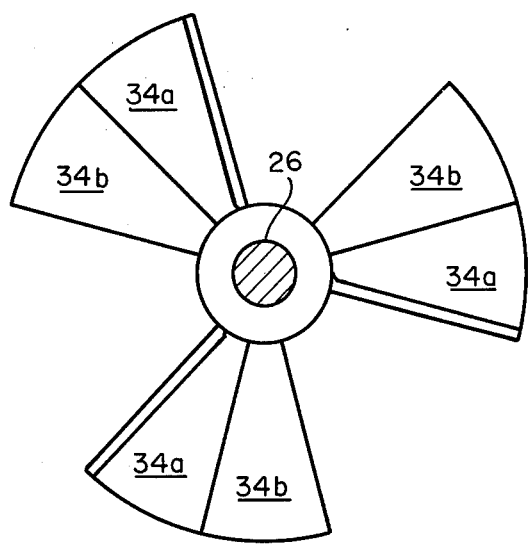
FIG. 7A shows a schematic end view taken along section A—A of FIG. 7.
Figure 7B:
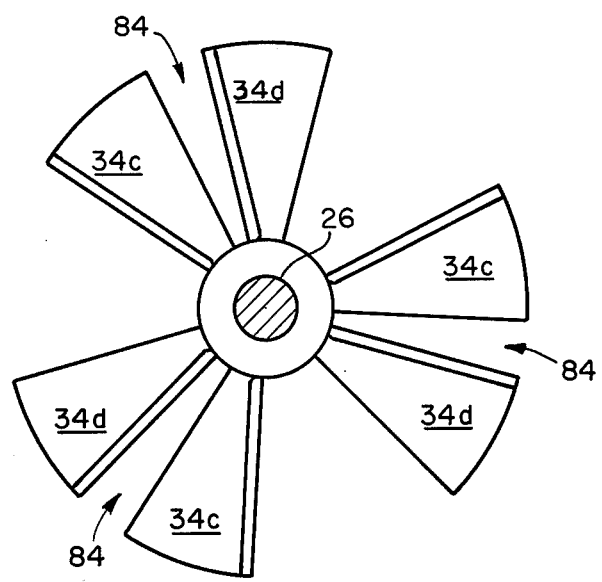
FIG. 7B shows a schematic end view taken along lines B—B of FIG. 7.

A preferred embodiment designed to mix under turbulent flow conditions is illustrated in FIGS. 7, 7A, and 7B. FIG. 7 shows a first mixing stage 80 and a second mixing stage 82. The mixing stages 80 and 82 separate mixing stages such as those illustrated in FIG. 1. The first mixing stage 80 includes two segments 34c and 34d, similar to the segment 34 illustrated in FIG. 1, each of which includes blades twisted in a first direction. However, the segments 34c and 34d are angularly spaced so as to create significant gaps 84 between adjacent blades. The gaps 84 are particularly evident in FIG. 7B, which schematically illustrates the relative angular positions of segments 34c and 34d. The angular position of the segments 34c and 34d in mixing stages 80 may be contrasted with the angular position of the segments 34a and 34b in the mixing stage immediately upstream of mixing stage 80 by examining FIG. 7A. In FIG. 7A it is apparent that there is no angular gap between adjacent segments 34a and 34b. The size of the gaps 84 may be adjusted to achieve optimal mixing. However, the degree of adjustability of the gaps 84 is limited by the fineness of the indexing means 40 and 42. Utilizing the 12° indexing illustrated in FIGS. 3 and 4, the gaps 84 could be adjusted in 12° increments. The second mixing stage 82 includes segments 34 having blades twisted in the opposite direction to those of mixing stage 80. The segments 34 of mixing stage 82 are likewise angularly displaced relative to one another so as to create gaps 84 between the blades thereof. Thus, the rather short spiral channels defined by mixing stages 80 and 82 permit a significant amount of crossover flow between the channels such that the stages 80 and 82 impart a chopping action to the flow. This chopping action is highly desirable under turbulent flow conditions to achieve satisfactory mixing. It is within the scope of the present invention to either increase or decrease the number of segments in stages 80 and 82 depending on the substances being mixed. Additionally, of course, the number of turbulent or chopper stages 80 or 82 utilized within a given blender will also depend on the substances being mixed. Thus, it becomes apparent that because of the flexibility of the possible segment combinations that may be utilized within the conduit 22, the in-line blender 20 of the present invention may be constructed to achieve optimal flow conditions for any substances being mixed.

Another particularly novel feature of the present invention relates to the ease with which the in-line blender of the present invention may be assembled and disassembled. To assemble the in-line blender of the present invention, the retaining device 44 is secured to the end 56 of the shaft 26. This is accomplished by threadingly engaging the member 58 with the inner portion of the hub 50 and with the end 56 of shaft 26. A plurality of the mixing elements or segments 34 are then placed on the shaft 26 in sliding engagement therewith. Should one wish to axially space any segments from adjacent segments, spacer element 70 may also be placed in sliding engagement with the shaft 26 as desired. Each of the segments 34 is then positioned at a desired angular and axial position on the shaft 26. After the desired number of elements have been added to the shaft, the holding device 60 is placed on the end 68 of shaft 26 so as to hold the various elements in compression between the holding device 60 and the retaining device 44. This is accomplished by sliding the lock washer 66 in place against the last element on the shaft and by threadingly engaging nuts 62 and 64 on the end 68 of shaft 26. It should be understood, of course, that to a certain extent the sequence of the steps thus far described may be altered. For example, the mixing elements may be added to the shaft first and the retaining device 44 and holding device 60 subsequently added. Or the holding device may be engaged with the end 68 of shaft 26 before the retaining device 44 is engaged.

The shaft 26 with the mixing element mounted thereon is then placed into conduit 22. As was mentioned before, there is sufficient clearance between the tips of the blades 38 and the inner surface of conduit 22 to permit the entire assembly to slide in and out of conduit 22. The shaft 26 with the mixing elements mounted thereon is then secured within conduit 22 so as to prevent relative axial movement between the mixing assembly and the conduit 22. This is preferably accomplished by placing the retaining device 44 in to a bearing relationship with one end of the conduit and securing it thereto. This is accomplished by clamping the retaining device 44 between flange 54 of conduit 22 and the flange of an adjacent section of conduit.

Thus, it is apparent that the in-line blender of the present invention may be easily adapted for use in either laminar or turbulent flow conditions. This is so since the individual mixing elements of the in-line blender of the present invention may be assembled and arranged to form numerous different mixing paths. Furthermore, simply by using elements which have a greater or lesser number of blades, the number of flow channels may also be varied within the in-line blender. The blender is relatively simple in construction and inexpensive to manufacture. Finally, the components of the blender may be easily assembled and disassembled for cleaning and repositioning, adding further to the economy of operation.

While there have been described what are at present considered to be the preferred embodiments of the present invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A device for mixing a fluid comprising:
   (a) a conduit having a hollow interior disposed about a central axis; and
   (b) means for mixing a fluid including a plurality of stationary mixing stages extending in series along said axis within said conduit, each of said mixing stages defining a plurality of spiral channels within the hollow interior of said conduit, said spiral channels extending the entire length of each of said mixing stages, each of said mixing stages including a plurality of distinct segments extending in series along said axis, one of said mixing stages defining a plurality of spiral channels which rotate in a first angular direction, and another of said mixing stages defining a plurality of spiral channels which rotate in a second angular direction opposite to said first angular direction.

2. A device as defined in claim 1, further including means for adjusting the angular position of each of said segments about said axis with respect to adjacent segments.

3. A device as defined in claim 2, further including means for adjusting the axial position of each of said segments with respect to adjacent segments within said conduit.

4. A device as defined in claim 1, further including means for adjusting the axial position of each of said segments with respect to adjacent segments within said conduit.

5. A device as defined in claim 1, wherein each of said segments includes a plurality of blades extending outwardly from said axis.

6. A device for mixing a fluid comprising:
   (a) a conduit having a hollow interior disposed about a central axis;
   (b) a shaft extending longitudinally through said conduit along said axis; and
   (c) means for mixing a fluid including a plurality of stationary mixing stages extending in series along said axis within said conduit, each of said mixing stages defining a plurality of spiral channels within the hollow interior of said conduit said spiral channels extending the entire length of each of said mixing stages, each of said mixing stages including a plurality of distinct segments extending in series along said axis, one of said mixing stages defining a plurality of spiral channels which rotate in a first angular direction, and another of said mixing stages defining a plurality of spiral channels which rotate in a second angular direction opposite to said first angular direction.

7. A device as defined in claim 6, further including means for adjusting the angular position of each of said segments with respect to adjacent segments along said shaft.

8. A device as defined in claim 7, wherein said adjusting means comprises a hub on each of said segments each of said hubs being in sliding engagement with said shaft.

9. A device as defined in claim 8, wherein each of said hubs includes indexing means on the axial ends thereof for maintaining a predetermined fixed angular relationship between adjacent hubs.

10. A device as defined in claim 7, further including means for adjusting the axial position of each of said segments with respect to adjacent segments along said shaft.

11. A device as defined in claim 10, wherein said axial position adjustment means comprises a plurality of spacer elements in sliding engagement with said shaft, one of said spacer elements being positioned between adjacent segments, each of said spacer elements including indexing means on the axial ends thereof for maintaining a predetermined fixed angular relationship between adjacent hubs.

12. A device as defined in claim 8, wherein each of said segments includes a plurality of blades extending radially outwardly from said hub, each of said blades having a spiral twist.

13. A device as defined in claim 12, wherein the angular position of each of said hubs with respect to adjacent hubs along said shaft minimizes the space between the blades of adjacent segments and correspondingly optimizes blending for laminar flow of said fluid through said conduit.

14. A device as defined in claim 12, wherein the angular position of each of said hubs with respect to adjacent hubs along said shaft defines significant gaps between the blades of adjacent segments and thereby optimizes blending for turbulent flow of said fluid through said conduit.

15. A device as defined in claim 8, further including means for adjusting the axial position of each of said segments with respect to adjacent segments along said shaft.

16. A device as defined in claim 6, wherein each of said segments includes a plurality of blades affixed to said shaft and extending radially outwardly therefrom.

17. A device as defined in claim 16, wherein each of said segments includes a hub affixed to said shaft, and wherein said plurality of blades is affixed to said hub.

18. A device as defined in claim 6, wherein the angle of rotation of each of said spiral channels along each of said mixing stages is between 90° and 360°.

19. A device as defined in claim 6, wherein the leading edges of the blades in the segment of said second mixing stage which is adjacent said first mixing stage are positioned so as to bisect the spiral channels defined by said first mixing stage.

20. A device as defined in claim 6, wherein each of said segments includes from two to four blades, and wherein each of said mixing stages defines from two to four spiral channels.

21. A device as defined in claim 20, wherein each of said segments includes three blades, and wherein each of said mixing stages defines three spiral channels.

22. A device as defined in claim 6, further including retaining means affixed to said shaft at one end thereof, said retaining means being in bearing engagement with one end of said conduit and means on said shaft for holding said mixing stages in compression against said retaining means to thereby prevent axial movement of said mixing stages within said conduit.

23. A device as defined in claim 2, wherein said retaining member is releasably affixed to said shaft at one end thereof, said holding means is releasably affixed to said shaft at a second end thereof, and said shaft, said holding means, and said mixing stages are removably engaged within said conduit.

24. A device as defined in claim 6, including a first stationary mixing stage having a first number of segments therein, and a second stationary mixing stage having a second number of segments therein, said second number being unequal to said first member.

25. A device for mixing a fluid comprising:
 (a) a conduit having a hollow interior disposed about a central axis;
 (b) a shaft extending longitudinally through said conduit along said axis; and
 (c) a plurality of stationary mixing elements extending in series along said axis within said conduit, each of said elements including a hub affixed to said shaft and a plurality of blades affixed to said hub and extending radially outwardly therefrom,, wherein each of said hubs is in sliding engagement with said shaft and wherein each of said hubs includes indexing means on the axial ends thereof for maintaining a predetermined fixed angular relationship between adjacent hubs.

26. A device as defined in claim 25 wherein each of said blades has a spiral twist.

* * * * *